United States Patent
Granbery (10) Patent No.: US 10,681,772 B2
(45) Date of Patent: *Jun. 9, 2020

(54) FACILITATING WIRELESS CONNECTIONS USING A BLE BEACON

(71) Applicant: PAYPAL, INC., San Jose, CA (US)

(72) Inventor: John Hastings Granbery, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,048

(22) Filed: Oct. 1, 2018

(65) Prior Publication Data

US 2019/0223254 A1   Jul. 18, 2019

Related U.S. Application Data (60) Continuation of application No. 15/590,658, filed on May 9, 2017, now Pat. No. 10,091,836, which is a
(Continued)

(51) Int. Cl.
*H04W 84/18* (2009.01)
*H04W 76/14* (2018.01)
(Continued)

(52) U.S. Cl.
CPC .............. *H04W 84/18* (2013.01); *H04B 5/04* (2013.01); *H04L 29/08333* (2013.01);
(Continued)

(58) Field of Classification Search
CPC ..... H04W 84/18; H04W 12/04; H04W 84/12; H04W 4/80; H04W 16/14; H04W 76/14;
(Continued)

(56) References Cited

U.S. PATENT DOCUMENTS 7,477,890 B1   1/2009  Narayanaswami
D717,309 S    11/2014  Govindarajan
(Continued)

FOREIGN PATENT DOCUMENTS

WO   WO 2013/0184110   12/2013

OTHER PUBLICATIONS

Nilsson et al., "Bluetooth Low Energy vs. Classic Bluetooth: Choose the Best Wireless Technology for your Application", Article, Jun. 8, 2012, 5 Pages, Retrieved on [Aug. 6, 2015], Retrieved from the Internet <URL: http://www.medicalelectronicsdesign.com/article/bluetooth-low-energy-vs-classic-bluetooth-choose-best-wireless-technology-your-application>.
(Continued)

*Primary Examiner* — Faisal Choudhury
(74) *Attorney, Agent, or Firm* — Haynes and Boone, LLP (57) ABSTRACT

Systems and methods are provided for facilitating wireless connections using a Bluetooth® low energy (BLE) beacon installed at a location. In particular, the provided systems and methods may facilitate wireless connections by providing credentials for accessing a wireless network at the location when a user checks in to the location using a user device in communication with the BLE beacon. The provided systems and methods may further facilitate wireless connections by establishing a Wi-Fi Direct connection with the user device to quickly provide content to the user device while at the location.

20 Claims, 8 Drawing Sheets

Related U.S. Application Data division of application No. 14/248,273, filed on Apr. 8, 2014, now Pat. No. 9,648,652.

(51) Int. Cl.
| | |
|---|---|
| *H04W 84/12* | (2009.01) |
| *H04W 12/00* | (2009.01) |
| *H04L 29/08* | (2006.01) |
| *H04W 12/04* | (2009.01) |
| *H04B 5/04* | (2006.01) |
| *H04W 16/14* | (2009.01) |
| *H04W 4/80* | (2018.01) |
| *H04L 29/06* | (2006.01) |
| *H04W 12/02* | (2009.01) |

(52) U.S. Cl.
CPC ....... *H04L 67/1046* (2013.01); *H04W 12/003* (2019.01); *H04W 12/0013* (2019.01); *H04W 12/04* (2013.01); *H04W 16/14* (2013.01); *H04W 76/14* (2018.02); *H04W 84/12* (2013.01); *H04L 63/0442* (2013.01); *H04L 63/062* (2013.01); *H04L 63/0823* (2013.01); *H04W 4/80* (2018.02); *H04W 12/02* (2013.01)

(58) Field of Classification Search
CPC ........... H04W 12/0013; H04W 12/003; H04W 12/02; H04L 29/08333; H04L 67/1046; H04L 63/0442; H04L 63/062; H04L 63/0823; H04B 5/04
USPC ........................................................ 370/310
See application file for complete search history.

(56) References Cited

U.S. PATENT DOCUMENTS

| | | | |
|---|---|---|---|
| 8,972,296 | B2 | 3/2015 | Govindarajan et al. |
| 2001/0034836 | A1* | 10/2001 | Matsumoto ............. G06F 21/32 713/176 |
| 2009/0088188 | A1 | 4/2009 | Wormald et al. |
| 2012/0184330 | A1 | 7/2012 | Sun et al. |
| 2012/0214443 | A1 | 8/2012 | Daigle |
| 2013/0065584 | A1 | 3/2013 | Lyon et al. |
| 2013/0217333 | A1 | 8/2013 | Sprigg et al. |
| 2013/0346494 | A1 | 12/2013 | Nakfour et al. |
| 2014/0065960 | A1 | 3/2014 | Gang et al. |
| 2014/0149293 | A1 | 5/2014 | Laracey |
| 2014/0188708 | A1* | 7/2014 | Govindarajan ...... G06Q 20/202 705/39 |
| 2014/0188733 | A1 | 7/2014 | Granbery |
| 2014/0244747 | A1 | 8/2014 | Aggarwal et al. |
| 2015/0126117 | A1* | 5/2015 | Wong ................ H04W 52/0229 455/41.2 |
| 2015/0178641 | A1* | 6/2015 | Yepez .................... G06Q 10/02 705/5 |
| 2015/0189461 | A1 | 7/2015 | Pang et al. |
| 2015/0195008 | A1 | 7/2015 | Johnson et al. |
| 2015/0245281 | A1* | 8/2015 | Beguin ................ H04W 48/16 370/255 |
| 2015/0254630 | A1* | 9/2015 | Royyuru ............. G06Q 20/322 705/39 |

OTHER PUBLICATIONS

International Search Report and Written Opinion, dated Jul. 13, 2015, 11 pages, PCT/US2015/021878.

* cited by examiner

FACILITATING WIRELESS CONNECTIONS USING A BLE BEACON

CROSS REFERENCED TO RELATED APPLICATIONS

This application is a continuation of U.S. patent application Ser. No. 15/590,658, filed on May 9, 2017, which is a divisional of U.S. patent application Ser. No. 14/248,273, filed on Apr. 8, 2014, and issued as U.S. Pat. No. 9,648,652, all of which are incorporated herein by reference in their entirety.

BACKGROUND

Technical Field

Embodiments disclosed herein are related to systems and methods for facilitating wireless connections using a Bluetooth® low energy (BLE) beacon.

Related Art

Due to the increase in use of mobile devices and the improved networking and online capabilities of these mobile devices, merchants having physical "brick and mortar" storefronts may also have mechanisms for delivering advertisements and other information to the mobile devices while a user of the mobile device is in the merchant store. Some merchants may take advantage of platforms and services that allow a user to check in to the merchant or other location that they are in to deliver advertisements, specials, and other information. This allows the merchant to know that the user is at the store and provide specials and other information to the user. If the user is checking in via a social network, the user may also provide feedback about the merchant which may be useful or helpful for the merchant. If the user is checking in via a payment processing service, such as provided by PayPal, Inc. or San Jose, Calif., the user may be provided with options for selecting, ordering, and paying for items through the payment processing service when checking in, providing convenience for both the user and the merchant. In theory, checking provides benefits for both the user and the merchant. However, the users may have to perform the tedious process of checking in every time that they visit the merchant. And, if the user does not check in on every visit, then neither the user nor the merchant fully benefits from checking in. Further, if the user has limited data connectivity while at the merchant location due to poor cellular reception, the user may not be able to check in and/or receive any benefits associated with the check in.

BRIEF DESCRIPTION OF THE FIGURES

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

What is needed are systems and methods to facilitate communications over a non-cellular wireless protocol, such as Wi-Fi, when a user checks in at a location so the user can transmit and receive information while at the location without the user having to worry about their signal, cellular data transmission standard, or using data from their monthly plan to take advantage of features associated with the check in.

Consistent with some embodiments, there is provided a system. The system includes one or more wireless transceivers configured to send credentials for accessing a wireless network to a user device in communication with the one or more wireless transceivers, the credentials being sent using a Bluetooth® low energy (BLE) communications protocol, and establish a Wi-Fi Direct connection with the user device based on the device identifier when content for the user device is received from a remote server and determined to be too large for sending to the user device using the BLE communications protocol. The one or more wireless transceivers are also configured to send the content to the user device using the established Wi-Fi Direct connection when the content is determined to be too large for sending to the user device using the BLE communications protocol, and using the BLE communications protocol when the content is not determined to be too large for sending using the BLE communications protocol. The system also includes a network interface component coupled to the one or more wireless transceivers and in communication with the remote server over a network, the network interface component configured to receive the content from the remote server. The system further includes one or more processors configured to determine when the content received from the remote server is too large for sending using the BLE communications protocol, and a memory.

Consistent with some embodiments, there is also provided a method. The method includes steps of communicating with a beacon using Bluetooth® low energy (BLE) communications protocol to check in to a location, receiving credentials for accessing a wireless network from the beacon, and authenticating to the wireless network using the received credentials. The method may also be embodied in computer-readable media.

Consistent with some embodiments, there is further provided a method. The method includes steps of sending credentials for accessing a wireless network to a user device using a Bluetooth® low energy (BLE) communications protocol, receiving content from a remote server, establishing communications a Wi-Fi Direct connection with the user device when the received content is determined to be too large for sending to the user device using the BLE communications protocol, and sending the content to the user device using the established Wi-Fi Direct connection when the content is determined to be too large for sending to the user device using the BLE communications protocol, and using the BLE communications protocol when the content is not determined to be too large for sending using the BLE communications protocol. The method may also be embodied in computer-readable media.

Embodiments described herein may provide a user with credentials for accessing a wireless network provided at the location, such as a public Wi-Fi network, when the user checks in at the location through a BLE beacon. Embodiments described herein may further initiate a Wi-Fi Direct connection with a user device session to provide large amounts of data to the user device.

Figure 1:
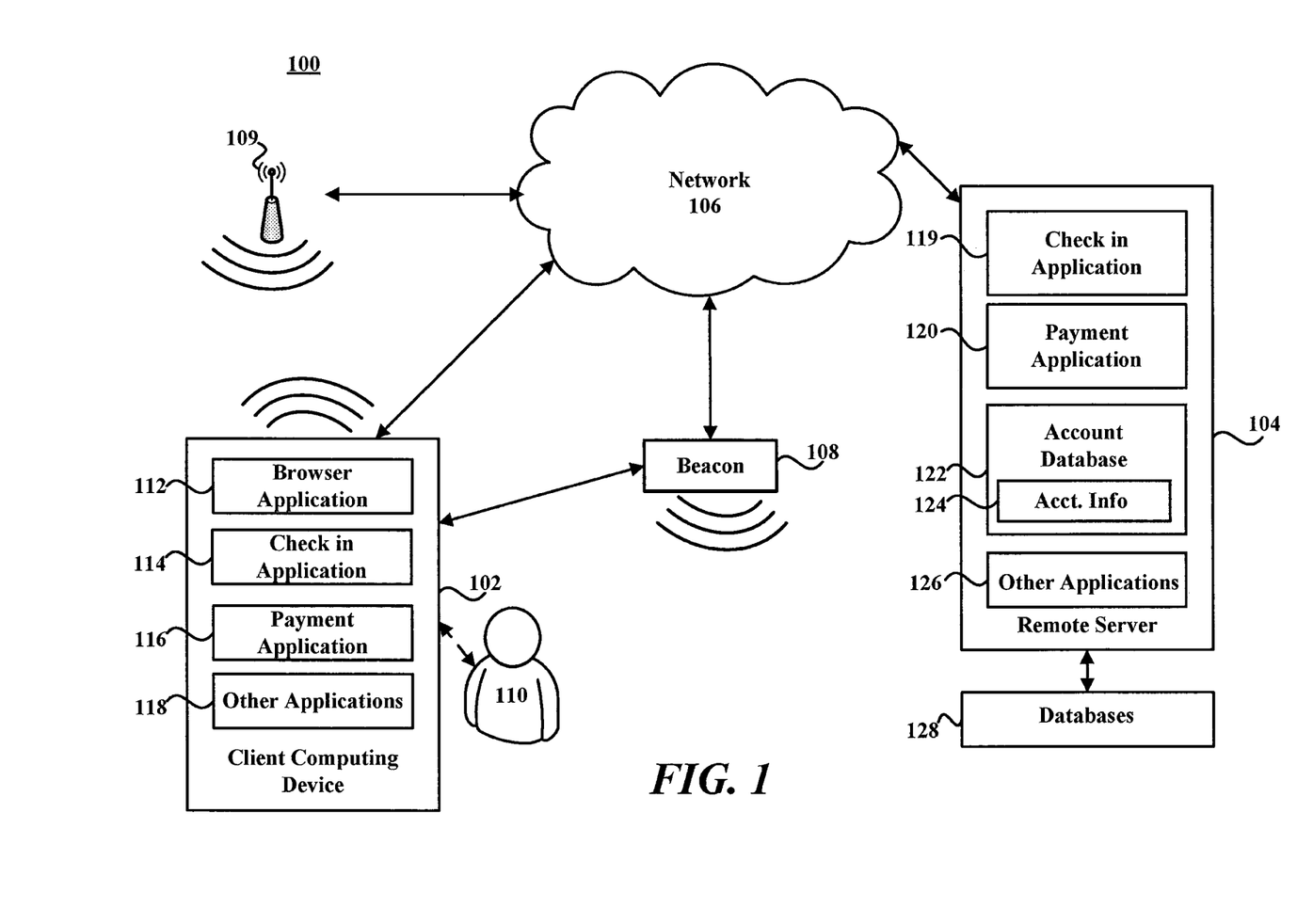
FIG. 1 is a block diagram of a networked system, consistent with some embodiments.

FIG. 1 is a block diagram of a networked system 100, consistent with some embodiments. System 100 includes a client computing device 102 and a remote server 104 in communication over a network 106. Remote server 104 may be a payment service provider server that may be maintained by a payment service provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may further be one or more servers that hosts functionality for users to "check in" to a location, event, and the like. Checking in may provide the user that checks in with special offers, deals, and the like, and may let the merchant or other proprietor of the location or event that the user is there. The user may also check in to a location for social purposes to let friends and contacts of the user know that they have checked in. The user may also check in to a location to pay for items. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

As shown in FIG. 1, system 100 may include one or more beacons 108 and one or more access points 109. In some embodiments, beacons 108 may be installed at a merchant location, such as a store, restaurant, and the like. In some embodiments, beacons 108 may be Bluetooth™ Low Energy (BLE) beacons. BLE is a technology that transmits information at a frequency of about 2.4 GHz (about 2042-2480 MHz) over forty (40) 2-MHz wide channels, and has a range of about 50 meter or about 160 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC) and 32-bit message integrity check for robustness. Moreover, in some embodiments, BLE-capable devices may consume a fraction of the power of standard Bluetooth® devices due to the protocol allowing low duty cycles, and being designed for applications that may not require continuous data transfer. Beacons 108 may transmit one or more sequences of information such that when a device such as client computing device 102 capable of receiving information from beacons 108 comes within the range of a beacon 108, the device may receive a transmission from a beacon 108 and be instructed to perform an action, such as display an advertisement, execute a payment application, or check a user 110 in to a particular location. In some embodiments, beacon 108 may be in communication with remote server 104 over network 106 through wireless or wired connection. Beacon 108 may also be capable of communicating with client computing device 102 using a Wi-Fi Direct connection. Wi-Fi Direct is a Wi-Fi standard that enables devices to initiate a peer-to-peer (P2P) connection with each other without the need for communicating through a network or wireless access point. In operation, Wi-Fi Direct compliant devices may include a software access point (Soft AP) that will allow compliant devices to exchange information using a Wi-Fi Protected Setup and connect. Once connected, the host device, which is the one initiating the connection, can provide data directly to the client device.

Access point 109 may be a wireless access point (WAP) that may facilitate wireless communications by client computing device 102 over network 106 according to one or more versions of the Institute of Electrical and Electronic Engineers (IEEE) 802.11 standard. Access point 109 may also be a wired router or bridge facilitating wireless communications over network 106 according to the IEEE 802.3 Ethernet standard. In some embodiments, client computing device 102 may be required to authenticate to access point 109 to connect to network 106, the authentication requiring one or more credentials. Moreover, access point 109 may be associated with remote server 104 such that access point 109 may be provided by an entity having an account with remote server 104 and access point 109 may be capable of providing information to remote server 104 over network 106.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown)

that includes instructions for execution by one or more processors (not shown) for causing client computing device 102 to perform specific tasks. In some embodiments, the instructions may be executed by the one or more processors in response to interaction by user 110. For example, such instructions may include browser application 112 such as a mobile browser application, which may be used to provide a user interface to permit user 110 to browse information available over network 106, including information hosted by remote server 104. For example, browser application 112 may be implemented as a web browser to view information available over network 106. Browser application 112 may include a graphical user interface (GUI) that is configured to allow user 110 to interface and communicate with remote server 104 or other servers managed by content providers or merchants via network 106. For example, user 110 may be able to access websites to find and purchase items, as well as access user account information or web content.

Client computing device 102 may also include a check in application 114 that may allow user 110 to check in to a location using a check in platform or service such as may be provided by PayPal, Inc. of San Jose, Calif., Foursquare of New York, N.Y., Facebook, Inc., of Menlo Park, Calif., Google+ of Google, Inc. of Mountain View, Calif., or Yelp Inc. of San Francisco, Calif., and implemented by remote server 104. In some embodiments, check in application may include multiple application programming interfaces (APIs) for checking in to one or more of the check in platforms or services. In some embodiments, checking in to a location while visiting a location such as a merchant physical storefront may provide user with exclusive deals, offers, or may allow user to purchase and pay for items.

Client computing device 102 may also include a payment application 116 that may be used by user 110 using client computing device 102 to make a payment. In some embodiments, payment application 116 may be configured to make a payment using remote server 104 as a payment processor. In some embodiments, functionalities provided by check in application 114 and payment application 116 may actually be provided by a single application. Client computing device 102 may include other applications 118 as may be desired in one or more embodiments to provide additional features available to user 110, including accessing a user account with remote server 104. For example, applications 118 may include interfaces and communication protocols that allow the user to receive and transmit information through network 106 and to remote server 104 and other online sites. Applications 118 may also include security applications for implementing client-side security features, programmatic client applications for interfacing with appropriate APIs over network 106 or various other types of generally known programs and/or applications. Applications 116 may include mobile applications downloaded and resident on client computing device 102 that enables user 110 to access content through the applications.

Remote server 104, according to some embodiments, may be maintained by an online payment provider, such as PayPal, Inc. of San Jose, Calif., which may provide processing for online financial and information transactions on behalf of user 110. Remote server 104, according to some embodiments, may also be maintained by a service that processes check ins so that a proprietor of a location, such as a merchant, or others know that user 110 is at the location and is able to provide content to user 110 as a result of the check in. Remote server 104 may also be capable of providing access to a merchant's goods and services (collectively referred to as "items") that are for purchase and may provide a payment service processing for the purchased items. Remote server 104 may include at least check in application 119, which may be configured to interact with client computing device 102 connected to network and remote server 104 to check user 110 in to a location. In some embodiments, checking client computing device 102 in to a location may allow user 110 and client computing device 102, to access features, specials, offers, and the like offered by the location. In some embodiments, these features, specials, offers, and the like may be provided and processed by remote server 104 on behalf of the location. In some embodiments, check ins may be automatic check ins made through the communication of client computing device 102 and beacon 108, such as described in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

Remote server 104 may also include a payment application 120 that may facilitate processing payments for user 110 to merchants, for example. In some embodiments, payment application 120 may be configured to interface with payment application 116 to receive payment details, user information, merchant information, and additional information for processing a payment on behalf of user 110. Payment application 120 may also be capable of interfacing with check in application 119 such that when a check in is processed a payment may be authorized for the location in which user 110 is checking in to. In some embodiments, functionalities provided by check in application 119 and payment application 120 may actually be provided by a single application. Remote server 104 may also include an account database 122 that includes account information 124 for users having an account on remote server 104, such as user 110. In some embodiments, payment application 120 may process payments based on information in account information 124 of account database 122. Remote server 104 may include other applications 126 and may also be in communication with one or more external databases 128, that may provide additional information that may be used by remote server 104. In some embodiments, databases 128 may be databases maintained by third parties, and may include third party account information of user 110.

As used herein, user 110 may have an account with remote server 104 such that account information 124 includes information about user 110. When user 110 checks in with remote server 104 or performs other authentication with remote server 104, client computing device 102 may be associated with user 110 such that remote server 104 recognizes client computing device 102 as being associated with user 110. In some embodiments, remote server 104 may send a cookie or other object to client computing device 102 that provides an indication of the association between user 110 and client computing device 102.

Although discussion has been made of applications and applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
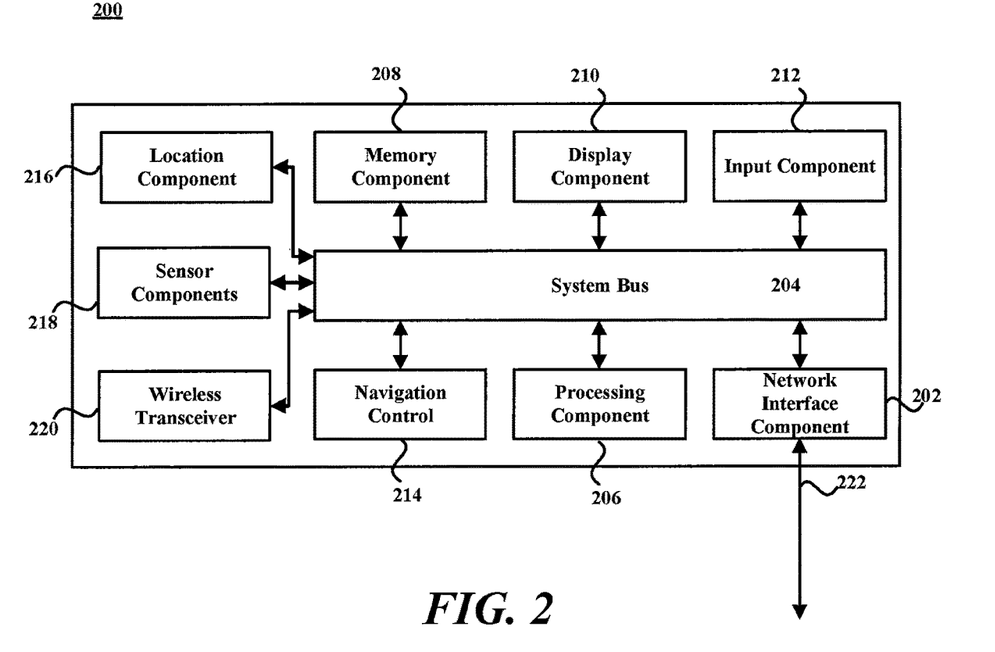
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user 120 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as consumer 120, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 110 and/or client computing device 102 that may be associated with any actions that user 110 performs using client computing device 102. Sensor components 218 may include camera and imaging components, accelerometers, biometric readers, GPS devices, motion capture devices, and other devices that are capable of providing information about client computing device 102 or user 110, or an environment therearound. Computing system 200 may also include one or more wireless transceivers 220 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
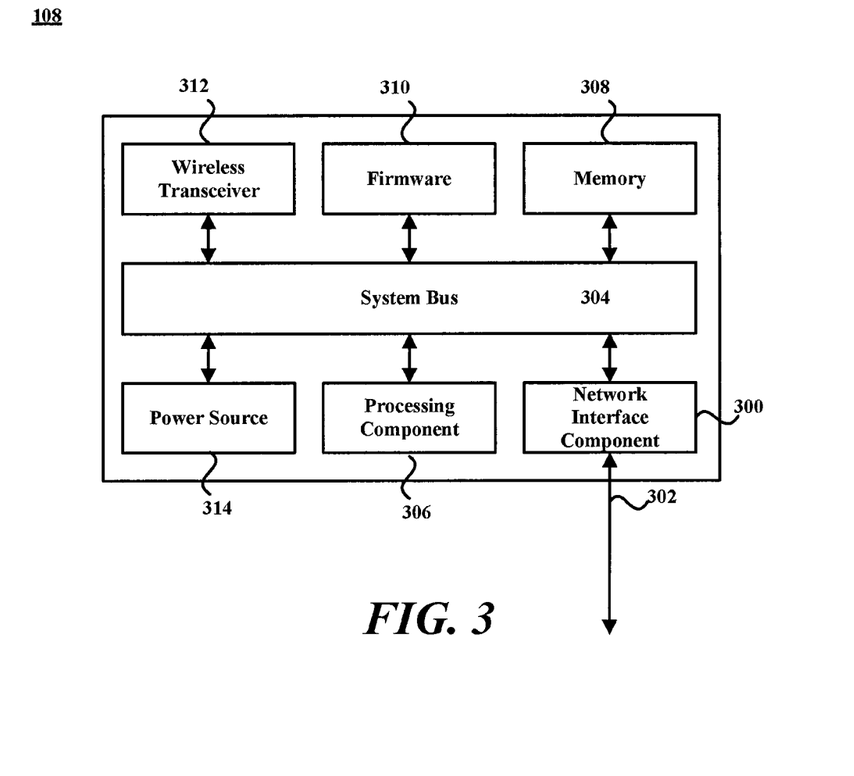
FIG. 3 is a diagram illustrating a beacon, consistent with some embodiments.

FIG. 3 is a diagram illustrating a beacon 108, consistent with some embodiments. As shown in FIG. 3, beacon 108 includes a network interface component (NIC) 300 configured for communication with a network such as network 106 shown in FIG. 1. Consistent with some embodiments, NIC 300 includes a wireless communication component, such as a wireless broadband component, a wireless satellite component, or various other types of wireless communication components including radio frequency (RF), microwave frequency (MWF), and/or infrared (IR) components configured for communication 302 with network 106. Consistent with other embodiments, NIC 300 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Beacon 108 also includes a system bus 304 for interconnecting various components within beacon 108 and communicating information between the various components. Such components include a processing component 306, which may be one or more processors, micro-controllers, graphics processing units (GPUs) or digital signal processors (DSPs), a memory component 308, firmware 310 and one or more wireless transceivers 312 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc. In some embodiments, wireless transceivers 312 and network interface component 302 may be part of the same component, or may be separate components. Moreover, network interface component 302 and/or wireless transceivers 312 may also be configured to establish communications with another device using Wi-Fi Direct. In some embodiments, network interface component 302 and wireless transceivers 312 may be capable of communicating with a device based on instructions executed by processing component 306. In other embodiments, network interface component 302 and wireless transceivers 312 may include one or more processors capable of executing instructions for establishing communications and communicating information over an established communication. Beacon 108 may also include a power source 314. Power source 314 may be any power source capable of providing sufficient current to power the components of beacon 108. In some embodiments, power source 318 may be a battery, such as a watch battery or button cell.

In some embodiments, beacon 108 may be configured to transmit information using network interface component 302 and/or wireless transceivers 312 based on instructions stored in memory 308 and/or firmware 310 executed by processing component 306 or by one or more processors in network interface component 302 or wireless transceivers 312. The instructions may be stored in memory 308 and/or firmware 310 by directly writing the instructions to memory 308 and/or firmware 310 over communication link 302 to beacon hardware interface 300 or by wirelessly receiving instructions by wireless transceivers 312. In some embodiments, beacon 108 may be configured to transmit information related to checking in to a merchant associated with beacon 108. In some embodiments, beacon 108 may also transmit instructions that when received by client computing device 102 may cause check in application 114 or payment application 116 to be executed by processing component 206 to cause client computing device 102 to perform a check in at the merchant associated with beacon 108. Further, beacon 108 may transfer instructions that, when received by client computing device 102 cause payment application 116 to be executed by processing component to allow user 110 to authorize a payment to be processed by remote server 104. In some embodiments, wireless transceiver 312 may correspond to a BLE transceiver configured to transmit and receive information according to the BLE protocol. In some embodiments, beacon 108 may be a BLE beacon or dongle such as described in U.S. patent application Ser. No. 13/938,860, filed on Jul. 10, 2013, the entire contents of which are hereby incorporated by reference in their entirety. Further, BLE beacon 108 may have a design such as shown in U.S. Design application No. 29/455,720, filed May 23, 2013, the entire contents of which are also incorporated herein by reference in their entirety.

As will be readily appreciated, the foregoing networks, systems, devices, methods and variations thereof can be used to implement an automated check in of users at a cooperating or subscribing establishment, such that subsequent purchase transactions and other activities can be more streamlined and convenient.

Figure 4:
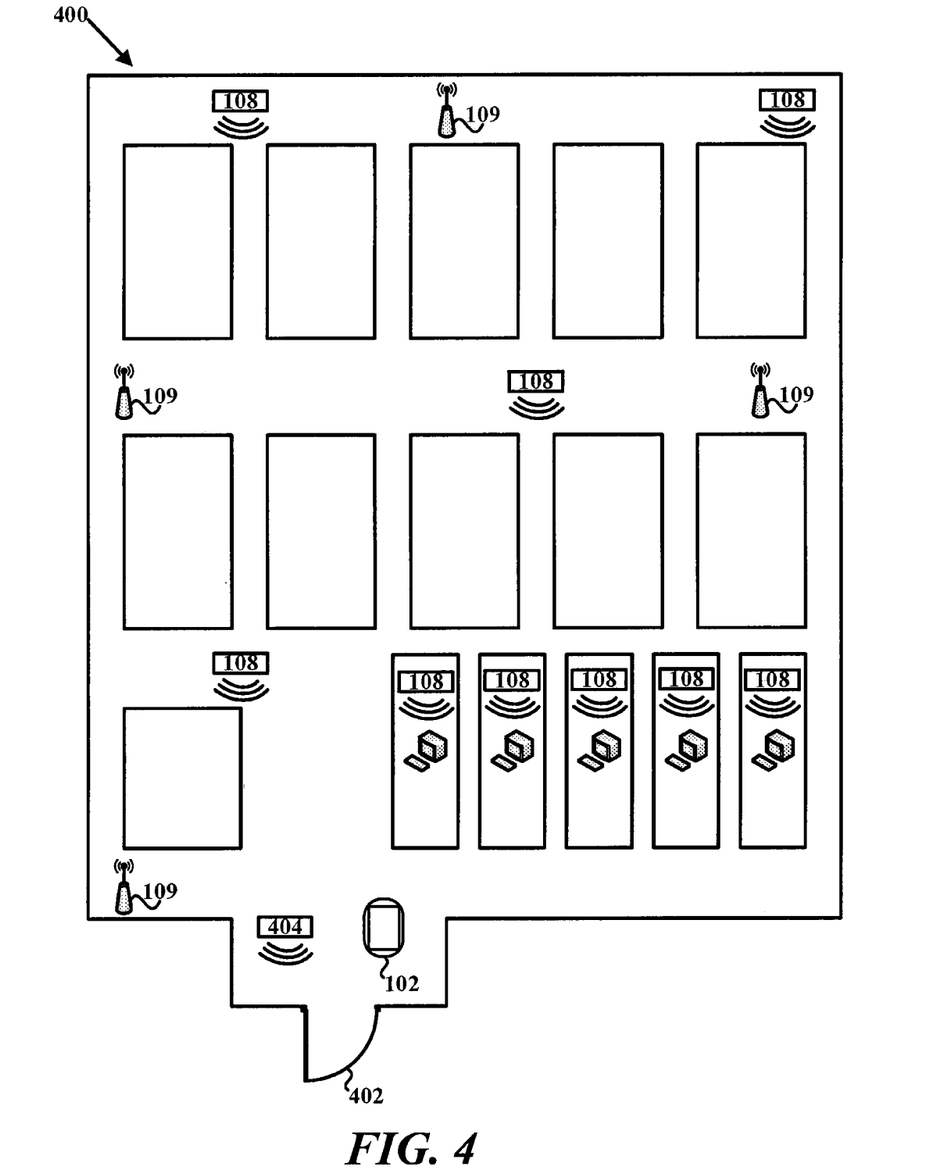
FIG. 4 is a diagram illustrating a location having multiple beacons throughout the location.

FIG. 4 illustrates in block diagram format an exemplary merchant location 400 and associated system components adapted for implementing the purchase of goods or services using automatic wireless consumer check ins according to some embodiments. It will be readily appreciated that this particular layout of merchant location 400 is only provided for purposes of illustration, and that many other types of layouts, devices, procedures and the like could be effectively implemented using the various principles of the present disclosure.

Merchant location 400 includes an indoor store floor having a number of beacons 108 and access points 109. In some embodiments, beacons 108 may be BLE beacons and access points 109 may be wireless access points (WAPs). These devices can be distributed strategically throughout merchant location, such as near the front door 402, at central locations, and/or at locations of high volume traffic within the establishment. One or more client computing devices 102 can interact with one or more of the beacons 108 throughout location 400. Preferably, only one interaction with a beacon is needed for a check in, although it may be useful for an establishment to know where user 110 is located and/or where user 110 travels and shopping patterns or habits within location 400. Such further information can be used to provide further advertising and promotional offers (e.g., related to something at or near where the user is physically located), and/or to authenticate the actual user versus one who may have stolen or is otherwise using the mobile device in an unauthorized fashion. Such further authentication can involve checking known user 110 traffic and shopping patterns against what is currently happening for a given device 102.

An actual automatic check in process can involve a subscribed or affirmatively active user 110 entering a merchant location 400, whereupon client computing device 102 associated with user 110 has a low level background program such as check in application 114 running that detects a low level BLE signal from one or more beacons 108 in the store. Client computing device 102 can then "wake up" and communicate on a more active level with beacon 108. In some embodiments, a device identifier and token can be generated and assigned to client computing device 102 for a particular time, location and session, with appropriate expiration and other safeguards in place to protect against fraud or other misuse. For example, a period of one or two hours might suffice for a typical check in session or event. The process of establishing communications between client computing device 102 and beacon 108 and exchanging metadata and a one-time use beacon token to perform a check in is described in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

When user 110 having client computing device 102 enters location 400, user 110 may complete the automatic check in facilitated by BLE beacon 108, as discussed above. In some embodiments, the check in may be performed between client computing device 102 and beacon 404 located near door 402 at an entrance to location. As user 110 moves through location 400 with client computing device 102, client computing device 102 may receive content from beacons 108, such as advertisements, offers, and the like, and may also be able to communicate with beacon 108 to effectuate a payment. In some embodiments, a merchant or other entity may want to provide a large amount of content, such as a video or audio advertisement to user 110 by displaying the content on client computing device 102. However, while beacons 108 may be sufficient for providing images, text, and other content that has a small file size using BLE communications, it may be difficult for beacons 108 to provide larger files over BLE communications. Consistent with some embodiments, beacons 108 may be configured to establish a Wi-Fi Direct connection with client computing device 102 to quickly deliver a large file, such as a video, and then close or terminate the Wi-Fi Direct connection. In some embodiments, other devices in location 400 may also be capable of establishing a Wi-Fi Direct connection with client computing device 102. In such embodiments, the connection may be facilitated by beacon 108.

Moreover, as user 110 with client computing device 102 travels through location 400, user 110 may want to connect to network 106 to send and receive e-mails, surf the web using browser application 112, and other internet-based activities. In some embodiments, network interface component 202 and/or wireless transceiver 220 may be configured for transmitting and receiving data over network using a cellular or mobile data standard such as EDGE, 3G, HSDPA, 4G, LTE, and the like, such transmissions may be metered by the network or cellular provider such that any data that is transmitted may cost user 110 in 10, 20, or 100 MB bundles, or may count against a data cap associated with an account of user 110. Moreover, as user 110 moves throughout location 400, which may be a covered or walled location, a connection to network 106 over a cellular or mobile data signal may become weaker, resulting in lower data speeds, or the reliance on lower speed standards such as EDGE. Consequently, location 400 may include one or more access points 109 that may provide a Wi-Fi connection to network 106 for client computing device 102.

However, since a proprietor of location 400 likely pays for the network and maintenance of access points 109, one or more credentials, such as a user name, Service Set Identifier (SSID), or password, may be required to establish a connection with access point 109, to prevent authorized use. In some embodiments, beacons 108 in location 400 may be configured to provide the one or more credentials to client computing device 102. For example, beacons 108 may be configured to provide the one or more credentials to client computing device 102 when client computing device 102 checks in to location 400, although in some embodiments, beacon 108 may provide the one or more credentials to client computing device 102 even when client computing device 102 does not check in to location 400. However, in some embodiments. the credentials for access points 109 may be a reward to user 110 for checking in to location 400 and implicitly agreeing to receive advertisements and offers related to location 400 on client computing device 102.

In some embodiments, the received credentials may be displayed on display component 210 of client computing device 102 as a prompt for user 110 to view, make note of, and enter into a form requesting credentials for connecting to access points 109. In some embodiments, check in application 114 may include additional instructions that, when executed, receive the credentials as part of the check in process performed with beacon 108, extracts and saves the credentials, and retrieves and enters the credentials when prompted by access point 109. In some embodiments, check in application 114 may further actively connect to access point 109 and enter the credentials as part of the check in process.

Figure 5:
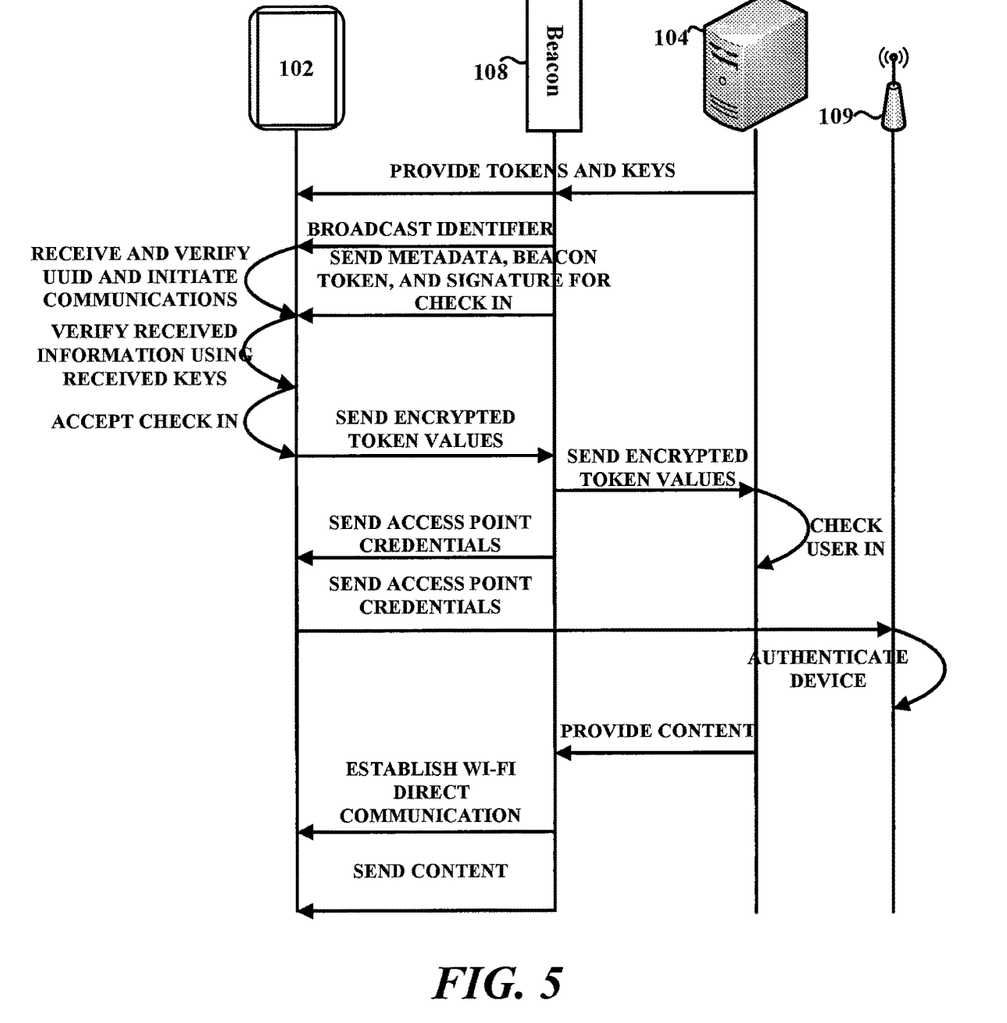
FIG. 5 is a diagram illustrating a flow for facilitating wireless communications with client computing device using a beacon, consistent with some embodiments.

FIG. 5 is a diagram illustrating a flow for facilitating wireless communications with client computing device 102 using beacon 108, consistent with some embodiments. As shown in FIG. 5, remote server 104 may provide beacon 108 and client computing device 102 with tokens and keys. In some embodiments, the tokens and keys may be one-time use payment tokens and associated keys wherein the associated keys may include a pair of symmetric keys and the tokens can each have, for example, a user identifier, a token value, a key serial number and an AES or other crypto key. In some embodiments, remote server 104 may provide beacon with tokens and keys when beacon 108 is set up to work with remote server 104 for checking in users through remote server 104. Remote server 104 may further provide beacon 108 with digital signatures and merchant one-time use tokens that may be used to track check ins and transactions. In some embodiments, tokens and keys may be provided to client computing device 102 when user 110 using client computing device 102 signs up for a check in service provided by remote server 104 and/or when check in application 114 is installed on client computing device 102.

Beacon 108 may then continuously broadcast a generic identifier. In some embodiments, the identifier may be a universally unique identifier (UUID) and the identifier may be broadcast using a BLE communications protocol. The broadcast identifier may be received and verified by client computing device 102 to initiate communications with beacon 108. Beacon 108 may then provide information including metadata, a specific one-time use beacon token, and a digital signature to client computing device 102. In some embodiments, client computing device 102 may request the metadata and other information from beacon 108 when communications are initiated with beacon 108. Check in application 114 may then verify the received information, including the digital signature, as being issued by the service provider using a public key received from remote server 104. When the received beacon information is verified as authentic, check in application 114 may provide user 110 with the option to check in. When user 110 accepts the check in, client computing device 102 may select a token received from remote server 104, encrypt the selected token value and the received beacon token value using a key associated with the selected token, and send these encrypted token values to beacon 108. Beacon 108 then sends the encrypted token values to remote server which decrypts the values and checks in user 110 and user device 110 using the decrypted values. The process of checking in by communicating with a BLE beacon, such as beacon 108, is further described in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

In some embodiments, beacon 108 may then transmit credentials for access point 109 to client computing device 102. In some embodiments, the transmitted credentials may include a user name, SSID, password, and the like. Client computing device 102 may use these credentials to authenticate with access point 109 and establish a wireless connection with access point 109 and communicate over network 106 through access point 109. In some embodiments, client computing device 102 may send these credentials to access point 109. In some embodiments, check in application 114 may include instructions that, when executed, cause the credentials to be provided to access point 109, including automatically providing the credentials when prompted by a communication from access point 109 and/or displaying the credentials on display component 210 of client computing device 102 for user 102 to take note of for entry. Access point 109 may receive the credentials provided by client computing device 102 and authenticate client computing device 102. Client computing device 102 may now be in communication with network 106 via a wireless connection with access point 109. Although FIG. 5 illustrates an example when a check in at location 400 is required to receive the one or more credentials, in other examples and embodiments, beacon 108 may provide the one or more credentials when client computing device 102 initially establishes communications with beacon 108.

In some embodiments, remote server 104 may want to provide content to client computing device 102. The content that may be provided to device 102 may be offers, deals, specials, information about location 400, and other such content. The content that may be provided to client computing device 102 may also be transaction-related content, including content related to paying for items user 110 is purchasing from location 400. However, in some embodiments, the content that may be provided to client computing device 102 may be one or more files having a large file size, such as video, audio, and the like. For example, remote server 104 may want to provide a video advertisement to client computing device 102. However, a large file such as a video advertisement may not be effectively transmitted from beacon 108 to client computing device 102, particularly using a BLE communications protocol. Consequently, beacon 108 may be configured to establish a Wi-Fi Direct connection with client computing device 102 and send the content to the client computing device 102 over the established Wi-Fi Direct connection. In some embodiments, once the content has been sent to client computing device 102, beacon 108 may close or terminate the Wi-Fi Direct connection with client computing device 102.

Figure 6:
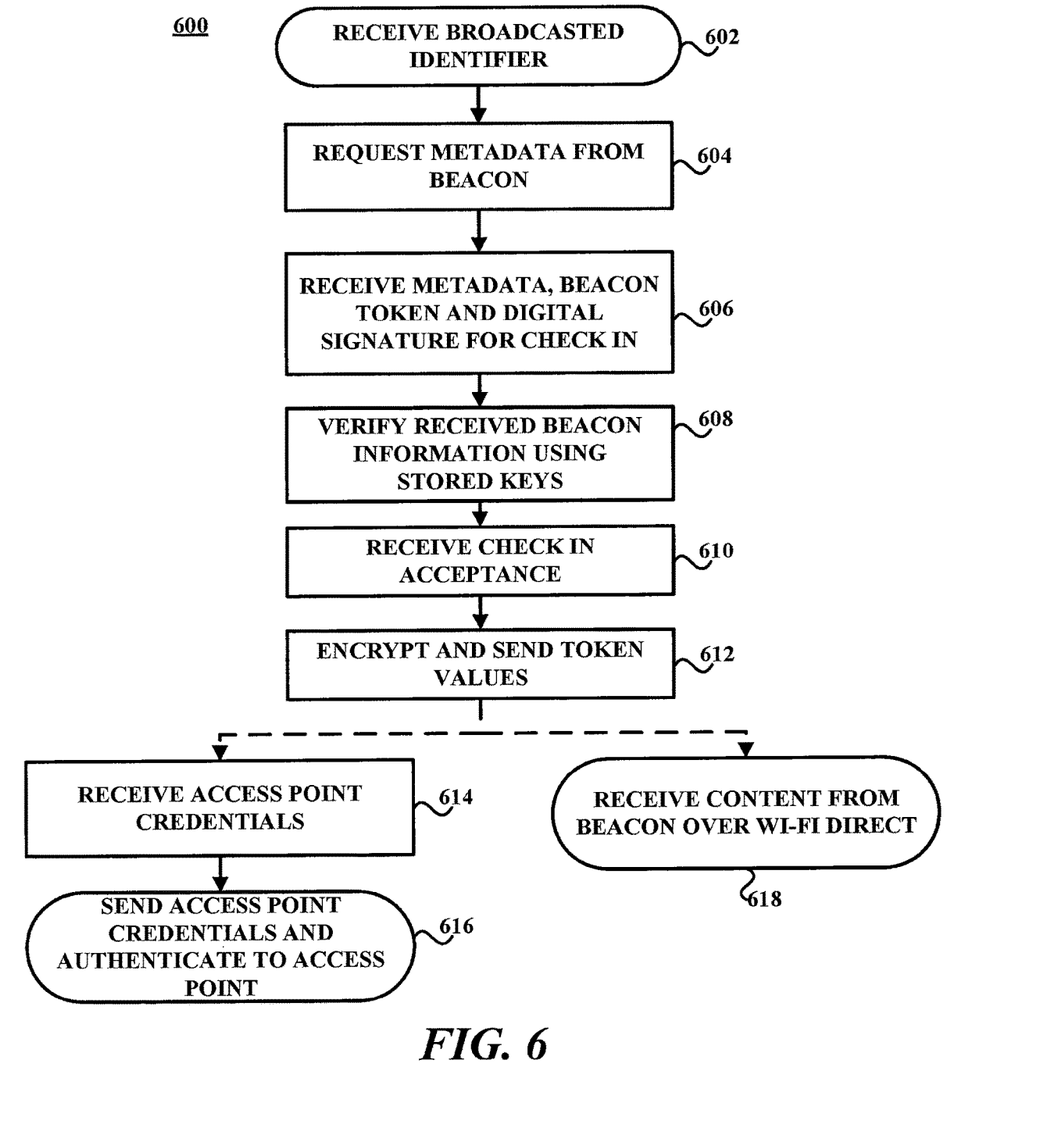
FIG. 6 is a flowchart illustrating a process for checking in to a location using a beacon that also facilitates further wireless communications, consistent with some embodiments.

FIG. 6 is a flowchart illustrating a process 600 for checking in to a location using a beacon that also facilitates further wireless communications, consistent with some embodiments. For the purpose of illustration, FIG. 6 may be described with reference to any of FIGS. 1-5. Process 600 shown in FIG. 6 may be embodied in computer-readable instructions for execution by one or more processors such that one or more of the steps of the method may be performed by processing component 206 of client computing device 102. As shown in FIG. 6, process 600 may begin when client computing device 102 receives a broadcasted identifier (602). The broadcasted identifier may be a UUID received from one or more beacons 108 in a location 400. In some embodiments, beacons 108 may be BLE beacons such that the identifier may be broadcast according to BLE communications protocols. Client computing device 102 may include wireless transceiver 220 that may be capable of communicating with a beacon 108 using BLE communication protocols and receiving the broadcasted identifier.

Client computing device 102 may then request metadata and other information from beacon 108 (604). In response, client computing device 102 may receive beacon information such as metadata, a beacon token and a digital signature from beacon 108 for checking in to location 400 (606). Processing component 206 of client computing device 102 may then verify the received beacon information, including the digital signature and beacon token, using keys stored in memory component 208 of client computing device 102 and received from remote server (618). Client computing device 102 may then receive a check in acceptance (610). In some embodiments, upon receiving the metadata, beacon token, and digital signature, check in application 114 may prompt user 110 to accept the check in to location 400 by, for example, displaying an interactive prompt on display component 210. User 110 may be able to accept the check in by interacting with the prompt using input component 212, navigation control, and display component 210, or a combination thereof. When client computing device 102 receives a check in acceptance, processing component 206 of client computing device 102 may then encrypt token values and send these encrypted values to beacon 108 (612). In some embodiments, the encrypted values may be sent to beacon 108 by wireless transceiver 220 of client computing device 102 using a BLE communication protocol.

Client computing device 102 may then receive credentials to authenticate to access point 109 (616). In some embodiments, the credentials may be received as part of the metadata received in step 608. In some embodiments, the received credentials may include a user name, SSID, password, and the like. Client computing device 102 may then send these credentials to authenticate with access point 109 (616). In some embodiments, client computing device 102 may automatically send these credentials to access point 109. In some embodiments, check in application 114 may include instructions that, when executed, cause the credentials to be provided to access point 109, including automatically providing the credentials when prompted by a communication from access point 109 and/or displaying the credentials on display component 210 of client computing device 102 for user 102 to take note of for entry.

In some embodiments, client computing device 102 may receive content from beacon 108 over a Wi-Fi Direct connection established with client computing device 102 (618). In some embodiments, remote server 104 may push content to beacons 108 for providing to client computing device 102 and the content may be one or more files having a large file size, such as video, audio, and the like. Beacon 108 may then establish a Wi-Fi Direct connection with client computing device 102 and send the content to the client computing device 102 over the established Wi-Fi Direct connection. In some embodiments, once the content has been sent to client computing device 102, the Wi-Fi Direct connection may be terminated.

Figure 7:
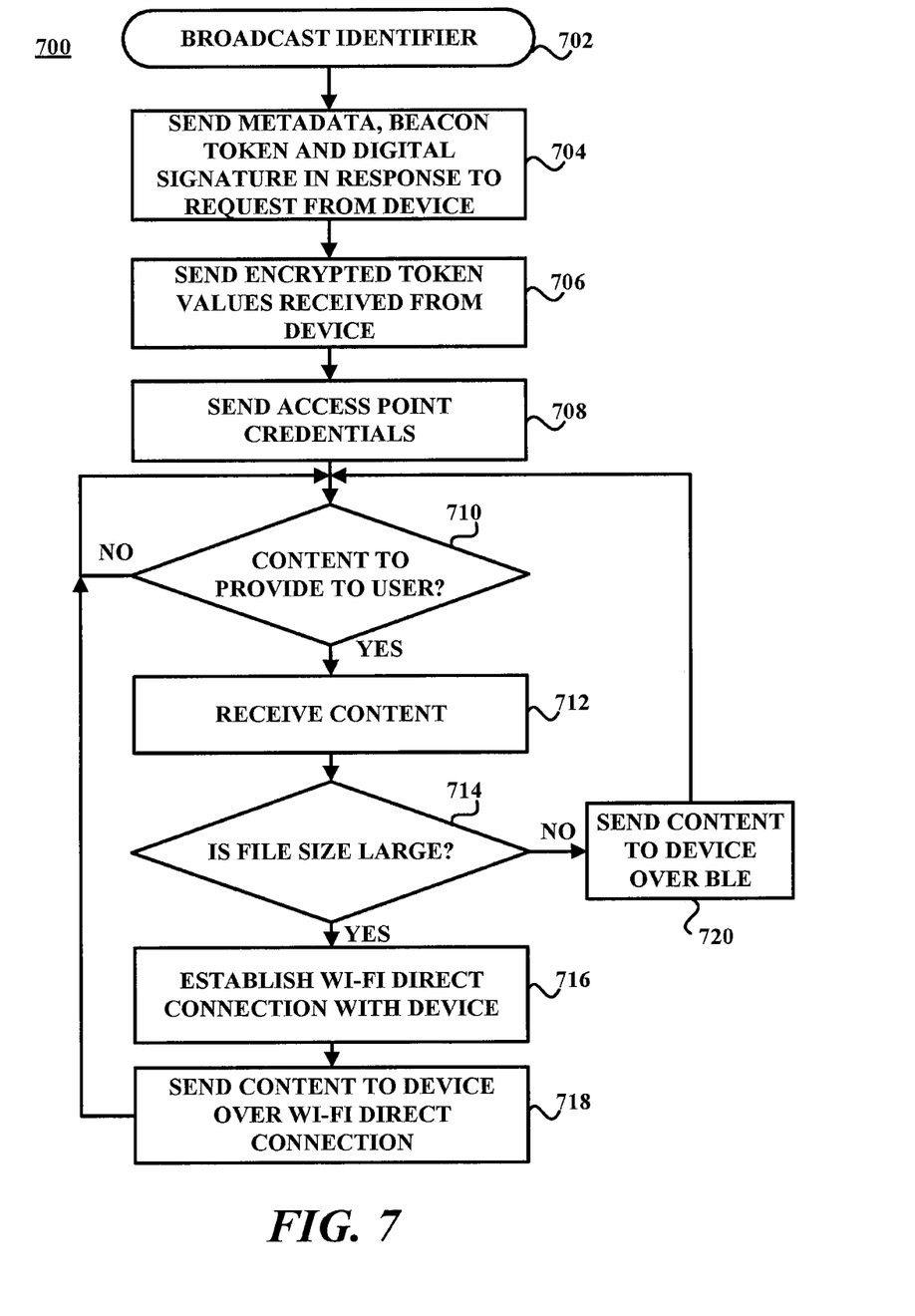
FIG. 7 is a flowchart illustrating a process for checking in to a location using a beacon and facilitating further wireless communications, consistent with some embodiments.

FIG. 7 is a flowchart illustrating a process 700 for checking in to a location using a beacon and facilitating further wireless communications, consistent with some embodiments. For the purpose of illustration, FIG. 7 may be described with reference to any of FIGS. 1-5. Process 700 shown in FIG. 7 may be embodied in computer-readable instructions for execution by one or more processors such that one or more of the steps of the method may be performed by processing component 306 of beacon 108, which may generally refer to any beacon 108 shown in FIG. 4, including beacon 404. As shown in FIG. 7, process 700 may begin when beacon 108 broadcasts an identifier (702). In some embodiments, beacon 108 may be a BLE beacon such that the identifier may be broadcast according to BLE communications protocols. The broadcast identifier may have been received from remote server 104 as part of a setup of beacon 108 in location 400 and may be a UUID.

Beacon 108 may then send metadata, a beacon token, and a digital signature in response to a request received from a device that received the broadcast identifier (704). In some embodiments, the beacon token, digital signature, and metadata may be received from remote server 104 and stored in memory component 308 and/or firmware 310. To complete the check in, beacon 108 may then receive encrypted token values from client computing device 102, which are sent to remote server 104 (706).

Beacon 108 may then send credentials to access point 109 to client computing device 102 (708). In some embodiments, the credentials may be sent as part of the metadata sent in step 704. In some embodiments, the sent credentials may include a user name, SSID, password, and the like. When there is content to provide to user 110 and client computing device 102 (710) beacon 108 may receive the content from remote server 104 over network 106 (712). Processing component 306 may make a determination as to whether the size of the content is suitable for transmission over a BLE communications protocol (714). When the size of the content is too large for transmission over a BLE communications protocol, beacon 108 may then establish a Wi-Fi Direct connection with client computing device 102 (716), and provide the content to client computing device over the Wi-Fi Direct connection (718). In some embodiments, beacon 108 may close or terminated the Wi-Fi Direct connection once the content has been sent to client computing device 102. When the size is determined to be suitable for transmission over the BLE communications protocol, beacon 108 may send the content to client computing device 102 over the BLE communications protocol (720).

Figure 8:
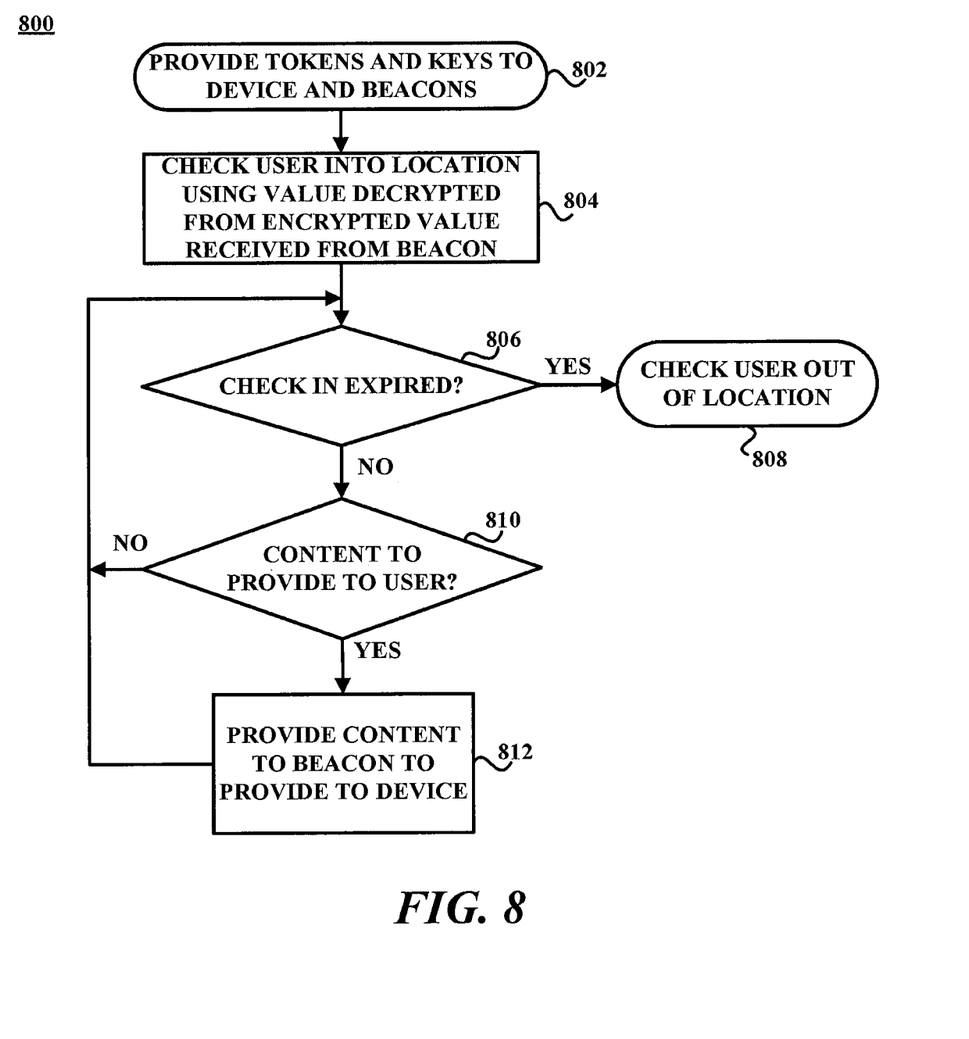
FIG. 8 is a flowchart illustrating a process for checking in to a location using a beacon and providing content to a client computing device, consistent with some embodiments.

FIG. 8 is a flowchart illustrating a process 800 for checking in to a location using a beacon and providing content to a client computing device 102, consistent with some embodiments. For the purpose of illustration, FIG. 8 may be described with reference to any of FIGS. 1-5. Process 800 shown in FIG. 8 may be embodied in computer-readable instructions for execution by one or more processors such that one or more of the steps of the method may be performed by processing component 206 of remote server 104. As shown in FIG. 8, process 800 may begin by providing client computing device 102 and beacon 108 tokens and keys (802). In some embodiments, the tokens and keys may be one-time use payment tokens and associated keys wherein the associated keys may include a pair of symmetric keys and the tokens can each have, for example, a user identifier, a token value, a key serial number and an AES or other crypto key. In some embodiments, remote server 104 may provide beacon 108 with tokens and keys when beacon 108 is set up to work with remote server 104 for checking in users through remote server 104. Remote server 104 may further provide beacon 108 with digital signatures and merchant one-time use tokens that may be used to track check ins and transactions. In some embodiments, tokens and keys may be provided to client computing device 102 when user 110 using client computing device 102 signs up for a check in service provided by remote server 104 and/or when check in application 114 is installed on client computing device 102.

Remote server 104 may then check user 110 and client computing device 102 into location 400 using one or more values decrypted from encrypted values received from beacon 108 (804). As discussed above with respect to FIGS. 5-7, when user 110 of client computing device 102 accepts a check in, client computing device 102 may verify a beacon token provided by beacon 108 and may then encrypt token values and send these encrypted values to beacon 108 which may then send the encrypted values to remote server 104 which processing component 206 of remote server 104 may decrypt and use to check in user and client computing device 102 to location 400.

Processing component 206 may determine when a check in has expired (806) and check user 110 and client computing device 102 out of location 400 (808). However, as long as user is checked in to location, processing component 206 of remote server 104 may periodically determine that there is content to provide to user 110 and client computing device 102 (810), and will provide the content to one or more beacons 108 at location 400 (812). In some embodiments, at least one of the beacons 108 may provide the content to client computing device 102. As discussed with respect to FIG. 7, above, the content may be provided to client computing device 102 over a Wi-Fi Direct connection established between client computing device 102 and beacon 108 when the file size of the content is too large for transmission over a BLE communications protocol. Otherwise, the content may be provided to client computing device 102 by beacon 108 using a BLE communications protocol.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein may provide a user with credentials for accessing a public Wi-Fi network provided at the location when the user checks in at the location through a BLE beacon. Embodiments described herein may further initiate a Wi-Fi Direct communications session to provide the large amounts of data to the user device. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A method for data communication in a multi-network system, the method comprising:
   initiating a check-in process of a mobile device to a location, said initiating performed using a first communication protocol over a short-range wireless network;
   responsive to initiating the check-in process, determining that communication with the mobile device requires additional bandwidth not available when using the first communication protocol;

transmitting credentials over the short-range wireless network using the first communications protocol, the credentials for authenticating to a second wireless network that uses a second communication protocol that is different from the first communication protocol, the credentials for authenticating to the second wireless network comprising a password; and establishing, using the credentials, a connection for the mobile device on the second wireless network for facilitating the communication using the second communication protocol.

2. The method of claim 1, wherein performing the check-in process comprises:

transmitting a broadcast identifier and a digital signature to the mobile device for verification on the mobile device; and responsive to receiving the verification from the mobile device, continuing the check-in process.

3. The method of claim 1, wherein said determining that the communication with the mobile device requires the additional bandwidth comprises determining that the communication comprises audio or video content; and the second wireless network provides the additional bandwidth required for the communication of the audio or video content.

4. The method of claim 1, wherein:

said establishing the connection comprises authenticating the mobile device for accessing a beacon over the short-range wireless network and the second wireless network; and the communication is provided by a remote server to the beacon for transmission to the mobile device.

5. The method of claim 1, wherein said establishing the connection further comprises authenticating the mobile device for accessing, at the location, a broadband network using one or more access points.

6. The method of claim 1, wherein the credentials further comprising a Service Set Identifier (SSID) for establishing a peer-to-peer connection for the second wireless network.

7. The method of claim 1, further comprising:

broadcasting, using the first communications protocol over the short-range wireless network, a broadcast identifier;

wherein said initiating the check-in process comprises performing the transmitting of the credentials in response to receiving a response from the mobile device referencing the broadcast identifier.

8. The method of claim 1, wherein the second communication protocol is a peer-to-peer protocol, between the mobile device and a beacon device, facilitating an authentication of the mobile device to a remote server that provides the communication over the connection to the mobile device via the beacon device.

9. The method of claim 1, further comprising:

responsive to a determination that the communication has been communicated to the mobile device, terminating the connection.

10. A device for data communication in a multi-network system, the device comprising:

a non-transitory memory storing instructions; and a processor configured to execute the instructions to cause the device to:

check-in, via a first communications protocol over a short-range wireless network, a mobile device to a location;

determine that content received from a remote server is of a predetermined content type;

transmit credentials over the short-range wireless network to the mobile device, the credentials for authenticating the mobile device to a second wireless network that uses a second communication protocol that is different from the first communication protocol, the credentials for authenticating to the second wireless network comprising a password; and establish, using the credentials, a connection for the mobile device on the second wireless network for facilitating communication of the content using the second communication protocol.

11. The device of claim 10, wherein said determining that the content is of the predetermined content type comprises determining that the content comprises audio and/or video type that requires additional bandwidth not available when using the first communication protocol.

12. The device of claim 10, wherein said establishing the connection comprises authenticating the mobile device for accessing the device over the short-range wireless network and the second wireless network; and the communication is provided by the remote server to the device for transmission to the mobile device.

13. The device of claim 10, wherein said establishing the connection further comprises authenticating the mobile device for accessing, at the location, a broadband network using one or more access points.

14. The device of claim 10, wherein the second communication protocol is a peer-to-peer protocol, between the mobile device and a beacon device, facilitating an authentication of the mobile device to the remote server that provides the communication over the connection to the mobile device via the beacon device.

15. The device of claim 10, wherein executing the instructions further causes the device to:

broadcast, using the first communications protocol over the short-range wireless network, a broadcast identifier;

wherein said check-in comprises performing the transmitting of the credentials in response to receiving a response from the mobile device referencing the broadcast identifier.

16. A non-transitory machine-readable medium having stored thereon machine-readable instructions executable to cause a machine to perform operations comprising:

initiating a check-in process of a mobile device to a location, said initiating performed using a first communications protocol over a short-range wireless network;

responsive to initiating the check-in process, determining that communication with the mobile device requires additional bandwidth not available when using the first communication protocol;

transmitting credentials over the short-range wireless network to the mobile device, the credentials for authenticating the mobile device to a second wireless network that uses a second communication protocol that is different from the first communication protocol, the credentials for authenticating to the second wireless network comprising a password; and establishing, using the credentials, a connection for the mobile device on the second wireless network for facilitating the communication using the second communication protocol.

17. The non-transitory machine-readable medium of claim 16, wherein the operations further comprise:

said determining that the communication with the mobile device requires the additional bandwidth comprises determining that the communication comprises audio or video content; and the second wireless network provides the additional bandwidth required for the communication of the audio or video content.

18. The non-transitory machine-readable medium of claim 16, wherein said establishing the connection comprises authenticating the mobile device for accessing a beacon over the short-range wireless network and the second wireless network; and the communication is provided by a remote server to the beacon for transmission to the mobile device.

19. The non-transitory machine-readable medium of claim 16, wherein the operations further comprise:

said establishing the connection further comprises authenticating the mobile device for accessing, at the location, a broadband network using one or more access points.

20. The non-transitory machine-readable medium of claim 16, wherein the operations further comprise:

broadcasting, using the first communications protocol over the short-range wireless network, a broadcast identifier;

wherein said initiating the check-in process comprises performing the transmitting of the credentials in response to receiving a response from the mobile device referencing the broadcast identifier.

* * * * *